United States Patent
Konishi et al.

(10) Patent No.: US 9,487,894 B2
(45) Date of Patent: Nov. 8, 2016

(54) NONWOVEN FABRIC HAVING A GROOVED SURFACE AND HEAT-EXPANDED PARTICLES AND PRODUCTION METHOD FOR THE NONWOVEN FABRIC

(71) Applicant: Unicharm Corporation, Ehime (JP)

(72) Inventors: Takayoshi Konishi, Kagawa (JP); Toshio Hiraoka, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 14/388,149

(22) PCT Filed: Mar. 25, 2013

(86) PCT No.: PCT/JP2013/058631
§ 371 (c)(1),
(2) Date: Sep. 25, 2014

(87) PCT Pub. No.: WO2013/146702
PCT Pub. Date: Oct. 3, 2013

(65) Prior Publication Data
US 2015/0030811 A1 Jan. 29, 2015

(30) Foreign Application Priority Data

Mar. 30, 2012 (JP) ................................. 2012-079877

(51) Int. Cl.
*D04H 1/413* (2012.01)
*D21H 27/00* (2006.01)
(Continued)

(52) U.S. Cl.
CPC ........... *D04H 13/00* (2013.01); *B32B 37/0038* (2013.01); *B32B 37/20* (2013.01);
(Continued)

(58) Field of Classification Search
CPC ...... D04H 1/495; D04H 13/00; D04H 1/413; D04H 1/70; D04H 1/72; D04H 1/465; D21H 27/002; D21H 21/22; D21H 21/54; D21H 25/04; D21H 21/18; D21H 27/005; D21H 27/02; B32B 2038/0088; B32B 2038/166; Y10T 156/1023; Y10T 428/24504; Y10T 442/3772; D21F 11/006; D21F 11/008; D21F 11/145; A47K 2010/3266

USPC ......... 162/109, 115, 117, 123–133; 156/183, 156/209, 219; 284/282–284
See application file for complete search history.

(56) References Cited

U.S. PATENT DOCUMENTS 4,756,945 A * 7/1988 Gibb ....................... E04B 1/941
428/124
6,287,419 B1 * 9/2001 Takeuchi ................. D04H 1/42
162/115
(Continued)

FOREIGN PATENT DOCUMENTS

CN 2832892 Y 11/2006
CN 102256763 A 11/2011
(Continued)

OTHER PUBLICATIONS

International Search Report from corresponding PCT application No. PCT/JP2013/058631 dated Jul. 2, 2013 (4 pgs).

*Primary Examiner* — Jose Fortuna
(74) *Attorney, Agent, or Firm* — Brinks Gilson & Lione (57) ABSTRACT

A nonwoven fabric comprising heat-expanding particles, having bulk and high strength, and a method for producing the nonwoven fabric. The method includes a step of supplying a first sheet-forming material comprising fiber and water onto a belt, spraying a high-pressure water jet onto the first sheet layer to form grooves, forming a second sheet-forming material comprising fibers, heat-expanding particles and water into a second sheet layer, layering the first sheet layer and the second sheet layer to form a third sheet layer, drying the third sheet layer, and spraying high-pressure steam onto the third sheet layer to expand the heat-expanding particles. The nonwoven fabric is provided with a first layer having a plurality of grooves extending in the longitudinal direction and aligned in the transverse direction, on the first surface, and is provided with a second layer comprising expanded heat-expanding particles and fibers, on the second surface.

15 Claims, 7 Drawing Sheets

(51) Int. Cl.

| | | |
|---|---|---|
| *D21H 25/04* | (2006.01) | |
| *D21H 21/22* | (2006.01) | |
| *D04H 13/00* | (2006.01) | |
| *D04H 1/495* | (2012.01) | |
| *D04H 1/70* | (2012.01) | |
| *D21H 21/18* | (2006.01) | |
| *D21H 21/54* | (2006.01) | |
| *B32B 37/00* | (2006.01) | |
| *B32B 37/20* | (2006.01) | |
| *B32B 38/00* | (2006.01) | |
| *D04H 1/72* | (2012.01) | |
| *B32B 38/16* | (2006.01) | |

(52) U.S. Cl.
CPC ............ *B32B 38/00* (2013.01); *B32B 38/164* (2013.01); *D04H 1/413* (2013.01); *D04H 1/495* (2013.01); *D04H 1/70* (2013.01); *D04H 1/72* (2013.01); *D21H 21/18* (2013.01); *D21H 21/22* (2013.01); *D21H 21/54* (2013.01); *D21H 25/04* (2013.01); *D21H 27/002* (2013.01); *D21H 27/005* (2013.01); *B32B 2038/0088* (2013.01); *B32B 2038/166* (2013.01); *B32B 2307/726* (2013.01); *B32B 2309/12* (2013.01); *Y10T 156/1023* (2015.01); *Y10T 428/24504* (2015.01)

(56) References Cited

U.S. PATENT DOCUMENTS

| | | | | |
|---|---|---|---|---|
| 6,699,806 | B1 * | 3/2004 | Takeuchi | D21H 13/08 442/340 |
| 7,210,205 | B2 * | 5/2007 | Takeuchi | D21H 13/08 28/103 |
| 7,241,711 | B2 * | 7/2007 | Takai | D21H 25/005 162/147 |
| 7,250,382 | B2 * | 7/2007 | Takai | D21H 11/12 162/147 |
| 7,553,535 | B2 * | 6/2009 | Noda | A61F 13/511 428/131 |
| 8,580,080 | B2 * | 11/2013 | Nozaki | D21H 21/54 162/109 |
| 8,900,411 | B2 * | 12/2014 | Konishi | D21F 11/145 162/115 |
| 9,074,323 | B2 * | 7/2015 | Konishi | D04H 1/495 |
| 2002/0065011 | A1 * | 5/2002 | Takeuchi | D04H 1/42 442/336 |
| 2002/0100153 | A1 * | 8/2002 | Takai | D04H 1/465 28/104 |
| 2003/0000665 | A1 * | 1/2003 | Takai | D21H 25/005 162/115 |
| 2003/0000673 | A1 * | 1/2003 | Anderson | D21G 7/00 162/207 |
| 2003/0100240 | A1 * | 5/2003 | Takai | D21H 25/005 442/408 |
| 2007/0215678 | A1 * | 9/2007 | Swoboda | B65D 65/42 229/5.81 |
| 2007/0256805 | A1 * | 11/2007 | Reed | D21H 21/54 162/164.1 |
| 2007/0298220 | A1 * | 12/2007 | Noda | A61F 13/511 428/152 |
| 2011/0083819 | A1 * | 4/2011 | Nozaki | D21H 21/54 162/115 |
| 2011/0265939 | A1 | 11/2011 | Nakagawa et al. | |
| 2011/0294388 | A1 * | 12/2011 | Konishi | D04H 1/46 442/414 |
| 2013/0017370 | A1 | 1/2013 | Yamaguchi et al. | |
| 2014/0014284 | A1 * | 1/2014 | Konishi | D21F 11/145 162/115 |
| 2014/0246159 | A1 * | 9/2014 | Konishi | D04H 1/495 162/109 |
| 2015/0030811 | A1 * | 1/2015 | Konishi | D04H 1/495 428/159 |
| 2015/0057630 | A1 * | 2/2015 | Tange | D04H 1/425 604/374 |

FOREIGN PATENT DOCUMENTS

| | | | | |
|---|---|---|---|---|
| EP | 2281942 A1 | 2/2011 | | |
| JP | H05-339898 A | 12/1993 | | |
| JP | H10-88495 A | 4/1998 | | |
| JP | 2000-034695 A | 2/2000 | | |
| JP | 2003-003397 A | 1/2003 | | |
| JP | 2003-003398 A | 1/2003 | | |
| JP | 2009144316 A * | 7/2009 | | |
| JP | 2009-235627 A | 10/2009 | | |
| JP | 2009-287152 A | 12/2009 | | |
| JP | 2011-208297 A | 10/2011 | | |
| JP | WO 2011122355 A1 * | 10/2011 | ........ A61F 13/51121 | |
| JP | 2012202004 A * | 10/2012 | | |
| JP | WO 2012132549 A1 * | 10/2012 | ............ D21F 11/145 | |
| JP | 2013074919 A * | 4/2013 | | |
| JP | 2013076196 A * | 4/2013 | | |
| JP | 2013170328 A * | 9/2013 | | |
| JP | 2013209765 A * | 10/2013 | | |
| JP | 2013209766 A * | 10/2013 | | |
| JP | 2013209767 A * | 10/2013 | | |
| JP | 2013224500 A * | 10/2013 | | |
| JP | KR 20140144723 A * | 12/2014 | ............ D04H 1/495 | |
| JP | EP 2832909 A1 * | 2/2015 | ............ D04H 1/495 | |
| JP | 5752078 B2 * | 7/2015 | ............ D04H 1/495 | |
| JP | EP 2832909 A4 * | 9/2015 | ............ D04H 1/495 | |
| TW | 200738327 A | 10/2007 | | |
| WO | WO 2007/091960 A1 | 8/2007 | | |
| WO | WO 2012/132549 A1 | 10/2012 | | |

* cited by examiner

NONWOVEN FABRIC HAVING A GROOVED SURFACE AND HEAT-EXPANDED PARTICLES AND PRODUCTION METHOD FOR THE NONWOVEN FABRIC

RELATED APPLICATION

This application is a 35 U.S.C. §371 national phase filing of International Patent Application No. PCT/JP2013/058631, filed Mar. 25, 2013, through which and to which priority is claimed under 35 U.S.C. §119 to Japanese Patent Application No. 2012-079877, filed Mar. 30, 2012.

TECHNICAL FIELD

The present invention relates to a nonwoven fabric, and particularly it relates to a nonwoven fabric that is suitable, in particular, for use as a wipe or use as an absorbent article. The invention further relates to a method for producing the nonwoven fabric.

BACKGROUND ART

There are known, as prior art, bulky paper sheets produced by foaming foamable particles when a wet paper forming sheet containing the foamable particles uniformly dispersed and held in a pulp fiber layer is dried with a dryer (for example, PTLs 1 to 3).

CITATION LIST

Patent Literature

[PTL 1] Japanese Unexamined Patent Publication No. 5-339898
[PTL 2] Japanese Unexamined Patent Publication No. 10-88495
[PTL 3] Japanese Unexamined Patent Publication No. 2000-34695

SUMMARY OF THE INVENTION

Technical Problem

When a nonwoven fabric produced by the conventional methods for producing paper sheets described in PTLs 1 to 3 is to be used as a surface material for a wipe or absorbent article, it is often necessary to further increase the nonwoven fabric strength. It is therefore an object of the present invention to provide a nonwoven fabric comprising heat-expanding particles, which is bulky and has high strength, as well as a method for producing the nonwoven fabric.

Solution to Problems

In order to solve the aforementioned problems, the invention employs the following construction.

Specifically, the method of producing a nonwoven fabric according to the invention comprises the steps of: supplying a first sheet-forming material comprising fiber and water onto a belt moving in one direction, to form a first sheet layer on the belt, spraying a high-pressure water jet onto the first sheet layer to form grooves extending in the machine direction on the surface of the first sheet layer, forming a second sheet-forming material comprising fibers, heat-expanding particles and water into a sheet to form a second sheet layer layering the first sheet layer and the second sheet layer to form a third sheet layer, drying the third sheet layer, and a step of spraying high-pressure steam onto the third sheet layer from a steam nozzle to expand the heat-expanding particles.

Also, the nonwoven fabric of the invention has a longitudinal direction, a transverse direction crossing the longitudinal direction, a thickness direction perpendicular to the longitudinal direction and the transverse direction, a first surface perpendicular to the thickness direction and a second surface opposite the first in the thickness direction, and it is provided with a fiber-containing first layer having a plurality of grooves extending in the longitudinal direction and aligned in the transverse direction, on the first surface, and is provided with a second layer comprising expanded heat-expanding particles and fibers, on the second surface.

Advantageous Effects of Invention

According to the invention it is possible to obtain a nonwoven fabric with bulk and high strength, comprising heat-expanding particles.

DESCRIPTION OF EMBODIMENTS

Figure 1:
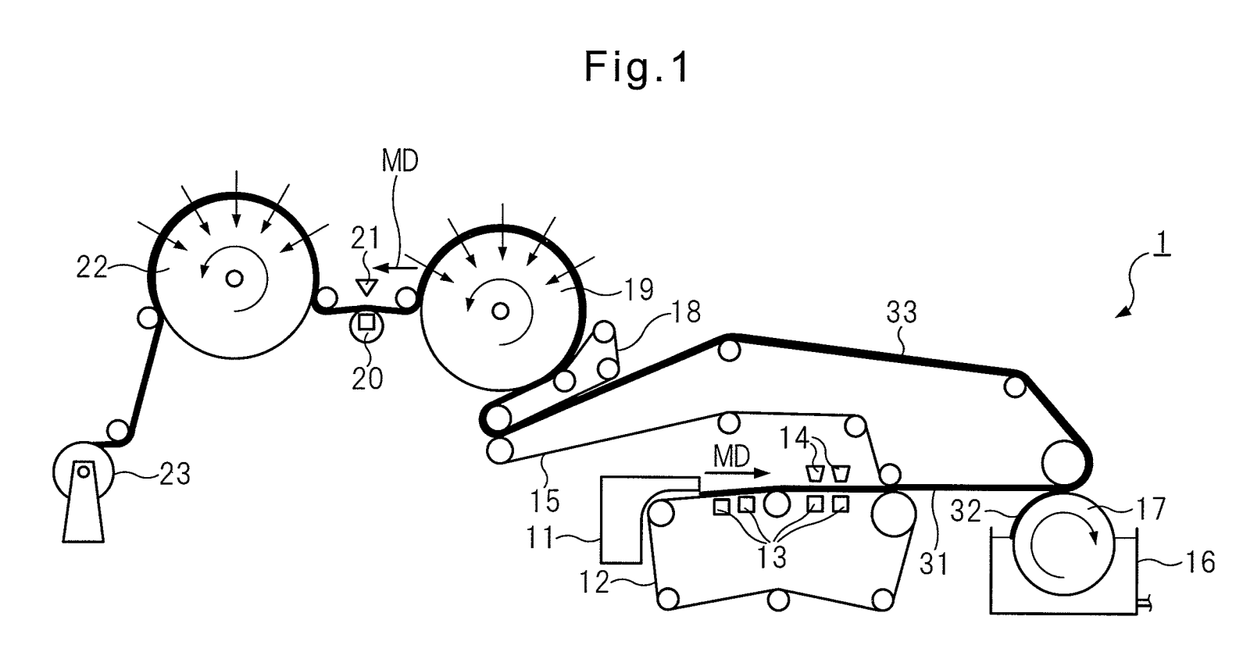
FIG. 1 is a diagram for illustration of a nonwoven fabric production apparatus to be used in a method for producing a nonwoven fabric according to an embodiment of the invention.

The method for producing a nonwoven fabric according to an embodiment of the invention will now be explained with reference to the accompanying drawings. FIG. 1 is a diagram for illustration of a nonwoven fabric production apparatus 1 to be used in a method for producing a nonwoven fabric according to an embodiment of the invention.

The first sheet-forming material is supplied to a starting material supply head 11. The first sheet-forming material supplied to the starting material supply head 11 is fed onto the sheet layer-forming belt of a sheet layer-forming conveyor 12 from the starting material supply head 11, and accumulated on the sheet layer-forming belt. The sheet layer-forming belt is preferably an air-permeable support that is permeable to steam. For example, a wire mesh, blanket or the like may be used as the sheet layer-forming belt.

The first sheet-forming material supplied to the starting material supply head 11 comprises fibers and water. The first sheet-forming material is, for example, a fiber suspension comprising fibers dispersed in water. The fibers to be used in the first sheet-forming material are preferably staple fibers with fiber lengths of not greater than 20 mm, for example. Such staple fibers may be cellulose-based fibers, for example, wood pulp such as chemical pulp, semichemical pulp or mechanical pulp from a conifer or broadleaf tree, mercerized pulp or crosslinked pulp obtained by chemical treatment of such wood pulp, or nonwood fibers such as hemp or cotton or regenerated fibers such as rayon fibers, or synthetic fibers such as polyethylene fibers, polypropylene fibers, polyester fibers or polyamide fibers. The fibers to be used in the sheet-forming material are most preferably cellulose-based fibers such as wood pulp, nonwood pulp or rayon fibers.

The first sheet-forming material accumulated on the sheet layer-forming belt is appropriately dehydrated by a suction box 13, and a first sheet layer 31 is formed. The first sheet layer 31 passes between two high-pressure water jet nozzles 14 situated on the sheet layer-forming belt, and two suction boxes 13, situated at locations sandwiching the sheet layer-forming belt and facing the high-pressure water jet nozzles 14. The high-pressure water jet nozzles 14 spray high-pressure water jets onto the first sheet layer 31. The suction boxes 13 draw and collect the water sprayed from the high-pressure water jet nozzles 14. The high-pressure water jets from the high-pressure water jet nozzles 14 are sprayed onto the first sheet layer 31, forming grooves on the surface of the first sheet layer 31.

Figure 2:
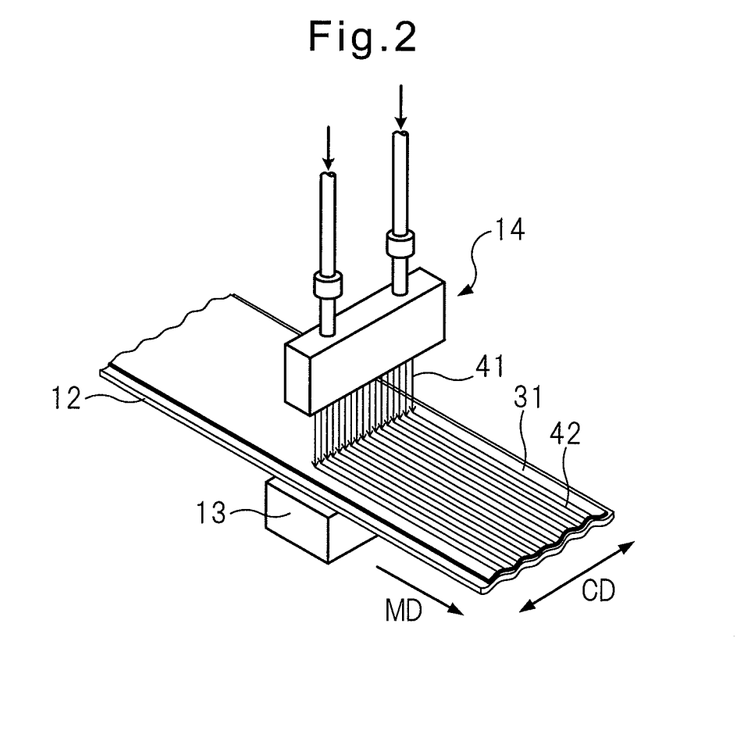
FIG. 2 is a diagram showing an example of a high-pressure water jet nozzle.

An example of a high-pressure water jet nozzle 14 is shown in FIG. 2. The high-pressure water jet nozzle 14 sprays a plurality of high-pressure water jets 41 arranged in the cross-machine direction (CD) of the first sheet layer 31, in the direction of the first sheet layer 31. As a result, a plurality of grooves 42 extending in the machine direction (MD) are formed on the surface of the first sheet layer 31, along the cross-machine direction (CD) of the first sheet layer 31.

Figure 3:
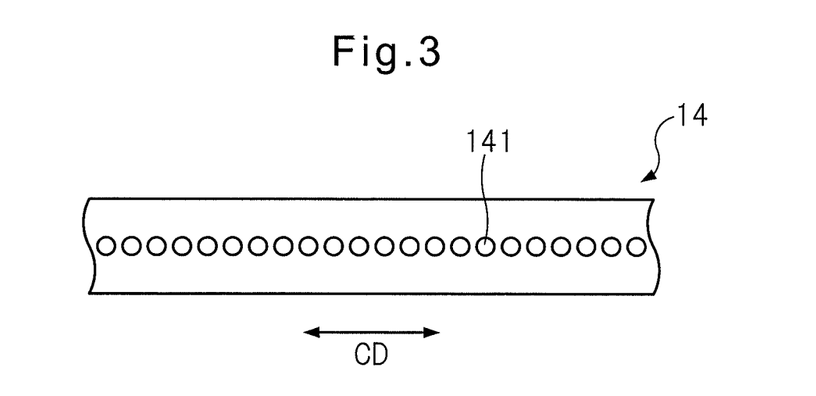
FIG. 3 is a diagram showing an example of a nozzle hole in a high-pressure water jet nozzle.

FIG. 3 is a diagram showing an example of nozzle holes in the high-pressure water jet nozzle 14. The nozzle holes 141 of the high-pressure water jet nozzle 14 are arranged, for example, in rows in the cross-machine direction (CD) of the sheet layer. The hole diameters of the nozzle holes 141 are preferably 90 to 150 μm. If the hole diameters of the nozzle holes 141 are smaller than 90 μm, the nozzles may tend to become clogged. If the hole diameters of the nozzle holes 141 are larger than 150 μm, the treatment efficiency may be reduced.

The hole pitch of the nozzle holes 141 (the distance between the centers of adjacent holes in the cross-machine direction (CD)) is preferably 0.5 to 1.0 mm. If the hole pitch of the nozzle holes 141 is less than 0.5 mm, the nozzle pressure resistance may be reduced and damage may occur. If the hole pitch of the nozzle holes 141 is greater than 1.0 mm, tangling of the fibers may be insufficient.

When the first sheet layer 31 receives the high-pressure water jets, grooves 42 are formed in the first sheet layer 31, as shown in FIG. 2. Also, when the first sheet layer 31 receives the high-pressure water jets, the fibers of the first sheet layer 31 become tangled, increasing the strength of the first sheet layer 31. The principle by which the fibers of the first sheet layer 31 become tangled when the first sheet layer 31 receives the high-pressure water jets will now be explained with reference to FIG. 4. The explanation of this principle is not intended to limit the scope of the invention.

Figure 4:
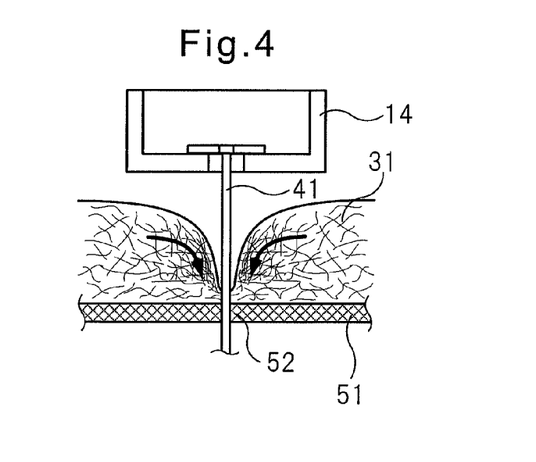
FIG. 4 is a diagram for illustration of the principle by which fibers in a first sheet layer are tangled by a high-pressure water jet.

When the high-pressure water jet nozzle 14 sprays the high-pressure water jets 41 onto the first sheet layer 31 as shown in FIG. 4, the high-pressure water jets 41 pass through the first sheet layer 31 and the sheet layer-forming belt 51. This causes the fibers of the first sheet layer 31 to be drawn inward around the section 52 where the high-pressure water jets 41 pass through the sheet layer-forming belt 51. As a result, the fibers of the first sheet layer 31 gather toward the section 52 where the high-pressure water jets 41 pass through the sheet layer-forming belt 51, causing the fibers to become tangled together.

Tangling of the fibers of the first sheet layer 31 increases the strength of the first sheet layer 31. This reduces opening of holes in the sheet layer and tearing and fly-off of the sheet layer, even when the sheet layer is sprayed with high-pressure steam in a subsequent step. The wet strength of the first sheet layer 31 can also be increased without adding a paper strength reinforcer to the sheet-forming material.

Figure 5:
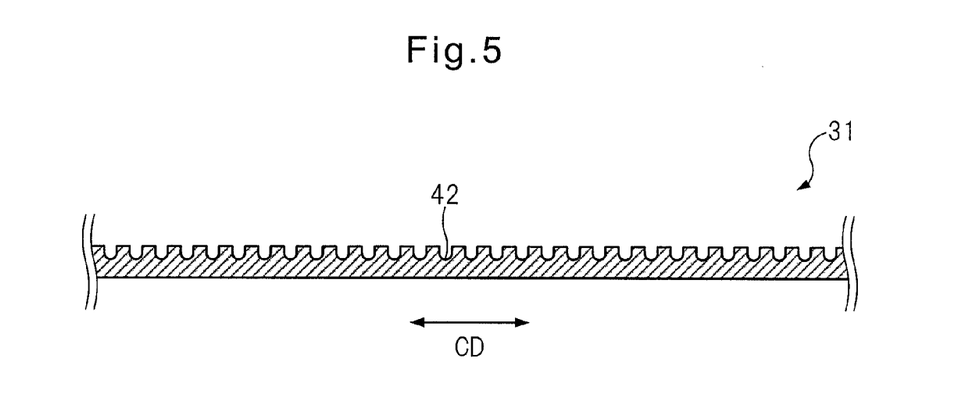
FIG. 5 is a widthwise cross-sectional schematic diagram of a first sheet layer that has been sprayed with a high-pressure water jet.

FIG. 5 shows a schematic diagram of a widthwise cross-section of a first sheet layer 31 at a location after it has passed between two high-pressure water jet nozzles 14 and two suction boxes 13. Grooves 42 are formed on the surface of the first sheet layer 31 by the high-pressure water jets. A pattern (not shown) is formed on the surface opposite the surface on which the high-pressure water jet was sprayed, corresponding to the pattern of the sheet layer-forming belt.

Next, as shown in FIG. 1, the first sheet layer 31 is transferred to a sheet layer-transporting conveyor 15. Also, a second sheet layer 32 is layered on the first sheet layer 31, forming a third sheet layer 33.

The second sheet layer 32 is formed in the following manner. A second sheet-forming material is supplied into the sheet-forming vat 16 in which a rotating cylinder mold 17 is situated. The second sheet-forming material comprises water, fibers and heat-expanding particles. The second sheet-forming material is, for example, a suspension comprising fibers and heat-expanding particles dispersed in water.

The fibers to be used in the second sheet-forming material supplied to the sheet-forming vat 16 are preferably staple fibers with fiber lengths of not greater than 20 mm, for example, similar to the fibers used in the first sheet-forming material. Such staple fibers may be cellulose-based fibers, for example, wood pulp such as chemical pulp, semichemical pulp or mechanical pulp from a conifer or broadleaf tree, mercerized pulp or crosslinked pulp obtained by chemical treatment of such wood pulp, or nonwood fibers such as hemp or cotton or regenerated fibers such as rayon fibers, or synthetic fibers such as polyethylene fibers, polypropylene fibers, polyester fibers or polyamide fibers. The fibers to be used in the sheet-forming material are most preferably cellulose-based fibers such as wood pulp, nonwood pulp or rayon fibers.

Figure 6:
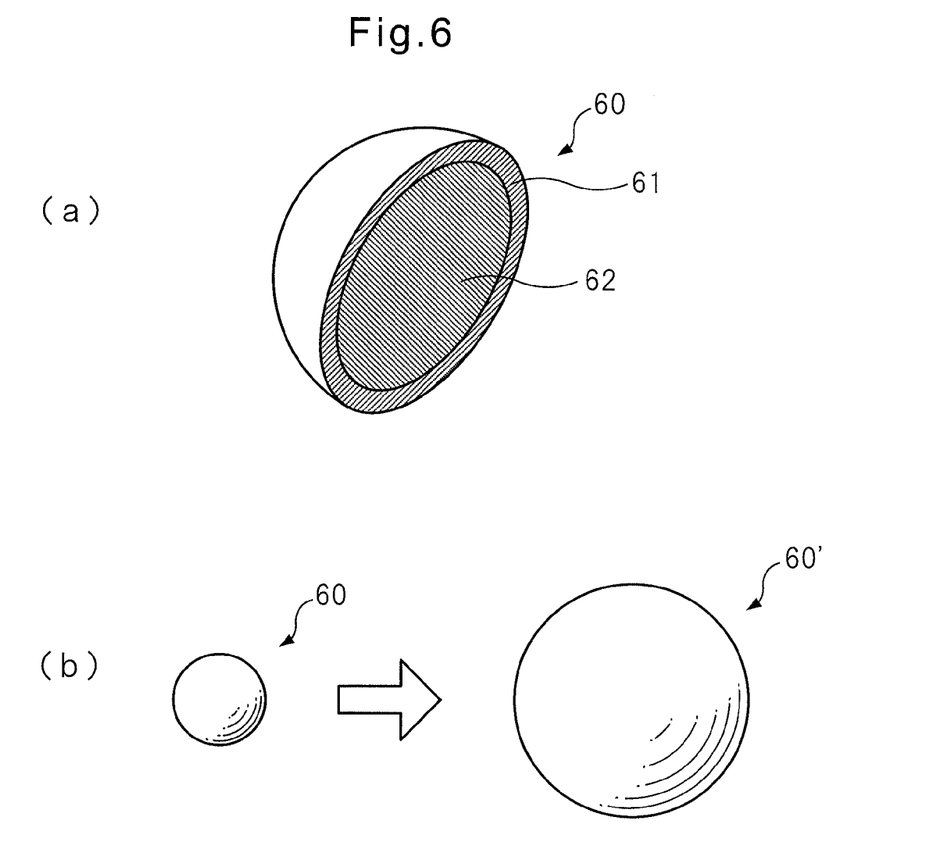
FIG. 6 is a schematic diagram for illustration of heat-expanding particles in a second sheet-forming material.

The heat-expanding particles in the second sheet-forming material will now be described. FIG. 6 is a schematic diagram for illustration of heat-expanding particles in a second sheet-forming material. As shown in FIG. 6(a), the heat-expanding particles 60 are composed of shells 61 of a thermoplastic resin and cores 62 filled with a low-boiling-point solvent. The thermoplastic resin to be used for the shells 61 of the heat-expanding particles 60 may be a copolymer such as vinylidene chloride, acrylonitrile, acrylic acid ester, methacrylic acid ester or the like. The low-boiling-point solvent filling the cores 62 of the heat-expanding particles 60 may be isobutane, pentane, petroleum ether, hexane, a low-boiling-point halogenated hydrocarbon, methylsilane, or the like.

The proportion of heat-expanding particles 60 in the second sheet-forming material is preferably 1 to 40 parts by weight and more preferably 3 to 20 parts by weight with respect to 100 parts by weight of the fibers. If the proportion of heat-expanding particles 60 in the second sheet-forming material is less than 1 part by weight with respect to 100 parts by weight of the fibers, the sheet layers described below, including the sheet layer formed from the second sheet-forming material, may not expand sufficiently. Also, even if the proportion of heat-expanding particles 60 in the second sheet-forming material is greater than 40 parts by weight with respect to 100 parts by weight of the fibers, the degree of expansion of the sheet layers, including the sheet layer formed from the second sheet-forming material, may be no different than when it is 40 parts by weight.

The mean particle diameter before thermal expansion of the heat-expanding particles 60 is preferably 5 to 30 and more preferably 8 to 14 μm. When the heat-expanding particles 60 are heated, the shells 61 of the thermoplastic resin are softened while the low-boiling-point solvent filling the cores 62 is gasified. This causes the heat-expanding particles 60 to expand into hollow heat-expanding particles 60' that have a greater volume, as shown in FIG. 6(*b*). The volume of the heat-expanding particles 60' after heating of the heat-expanding particles 60 is preferably 20-125 times and more preferably 50-80 times the volume of the heat-expanding particles 60 before expansion. As heat-expanding particles 60 in the second sheet-forming material there may be used Matsumoto Microspheres (F-36, F-30D, F-30GS, F-20D, F-50D, F-80D) (products of Matsumoto Yushi-Seiyaku Co., Ltd.), EXPANCEL (WU, DU) (product of Sweden, marketed by Japan Fillite Co., Ltd.). However, heat-expanding particles that may be used as the heat-expanding particles 60 in the second sheet-forming material are not limited to the heat-expanding particles mentioned above.

In order to improve anchoring of the heat-expanding particles onto the fibers in the second sheet-forming material, the second sheet-forming material may contain an anchoring agent such as FILEX RC-104 (product of Meisei Chemical Works, Ltd., cation-modified acrylic-based polymer) or FILEX M (product of Meisei Chemical Works, Ltd., acrylic copolymer). Also, the second sheet-forming material may further contain an anionic, nonionic, cationic or amphoteric yield improver or sizing agent.

Figure 7:
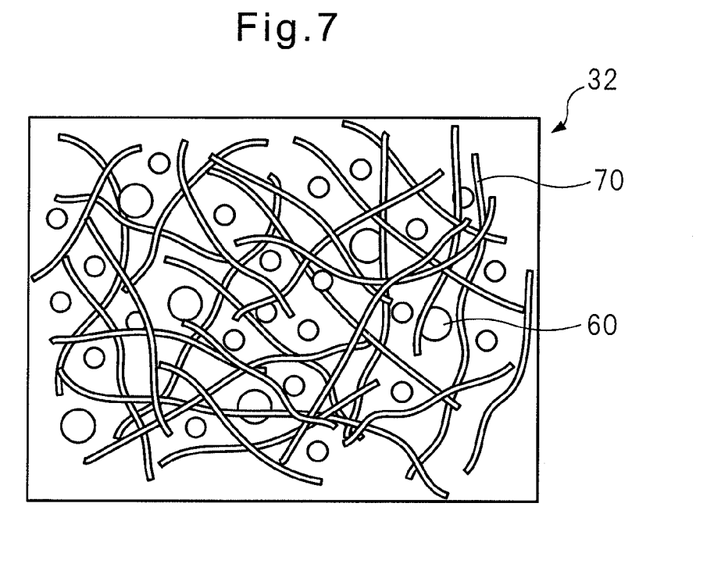
FIG. 7 is a schematic diagram for illustration of a second sheet layer.

The second sheet-forming material is sheeted to form a second sheet layer. For example, as shown in FIG. 1, the fibers to which the heat-expanding particles have been anchored in the second sheet-forming material supplied to the sheet-forming vat 16 may be drawn into a rotating cylinder mold 17 to form a second sheet layer 32 on the cylinder mold 17. The second sheet layer 32 will now be described with reference to FIG. 7. FIG. 7 is a schematic diagram for illustration of a second sheet layer 32. As shown in FIG. 7, the heat-expanding particles 60 are dispersed in the fibers 70 in the second sheet layer 32.

Figure 8:
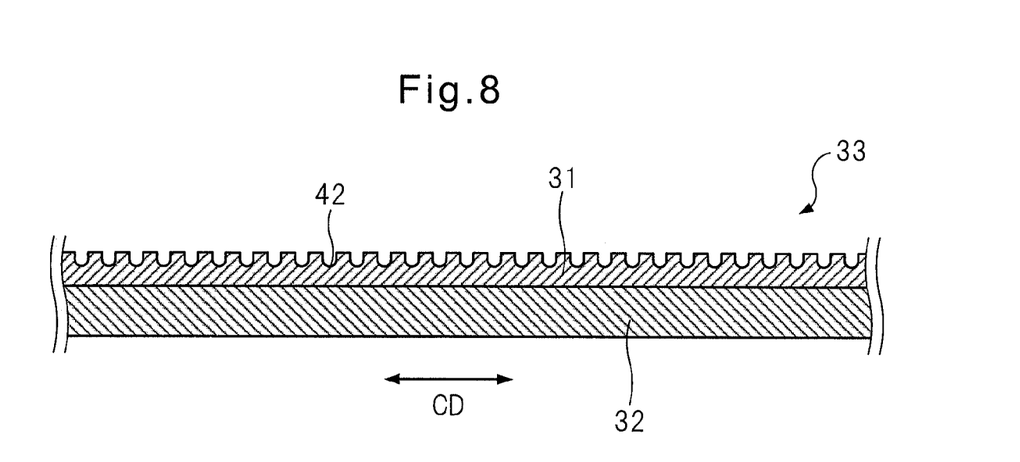
FIG. 8 is a widthwise cross-sectional schematic diagram of a third sheet layer.

The second sheet layer 32 formed on the cylinder mold 17 is transferred to the sheet layer-transporting conveyor 15 and compacted by the first sheet layer 31. This causes the second sheet layer 32 to be layered on the first sheet layer 31, as shown in FIG. 8, forming a third sheet layer 33 which is a sheet laminate of the first sheet layer 31 and the second sheet layer 32. FIG. 8 is a cross-sectional schematic diagram of the third sheet layer 33 in the cross-machine direction (CD).

As shown in FIG. 1, the third sheet layer 33 is transferred to the sheet layer-transporting conveyor 18, and then transferred to a dryer 19.

The dryer 19 heats the third sheet layer 33 to dry it. A Yankee dryer, for example, may be used as the dryer 19. The dryer 19 includes a rotating cylindrical dryer, the surface of the cylindrical dryer being heated to about 110° C. by steam. The dryer 19 adheres the third sheet layer 33 onto the surface of the rotating cylindrical dryer to dry the third sheet layer 33.

The dryer 19 dries the third sheet layer 33 to a moisture content of preferably 10% to 80%, more preferably 20% to 80% and even more preferably 20% to 60%. The "moisture content" is the amount of water contained in the sheet layer, where the weight of the dry mass of the sheet layer is defined as 100%.

If the moisture content of the third sheet layer 33 is less than 10%, the hydrogen bonding strength between the fibers of the third sheet layer 33 will be high, and the strong hydrogen bonding between the fibers may interfere with expansion of the third sheet layer 33 by the high-pressure steam described below. If the moisture content of the third sheet layer 33 is greater than 80%, on the other hand, most of the heat provided from the high-pressure steam described below will be used for evaporation of the moisture, and it may not be possible to supply sufficient heat to the heat-expanding particles. Also, the energy necessary for drying the third sheet layer 33 to below the prescribed moisture content by the high-pressure steam described below may be drastically increased in some cases.

When the third sheet layer 33 is to adhere to the surface of the cylindrical dryer of the dryer 19, the surface of the third sheet layer 33 on which the first sheet layer 31 is provided preferably adheres to the surface of the cylindrical dryer of the dryer 19. In other words, the heating surface during drying of the third sheet layer 33 by heating is preferably the surface of the third sheet layer, which is formed by the first sheet layer 31. This will allow heat from the dryer 19 to pass through the first sheet layer 31 section of the third sheet layer 33, reaching the second sheet layer 32 section where the heat-expanding particles are present. Thus, since the second sheet layer 32 section of the third sheet layer 33 is not excessively heated, it is possible to avoid excessive drying of the second sheet layer 32 section of the third sheet layer 33 when the third sheet layer 33 is dried by the dryer 19, and to avoid expansion of the heat-expanding particles in the second sheet layer 32 section. Also, since the first sheet layer 31 section of the third sheet layer 33 is preferentially dried, hydrogen bonding between the fibers of the first sheet layer 31 section of the third sheet layer 33 is strong and the strength of the first sheet layer 31 section is increased.

The third sheet layer 33 is then transported onto the mesh-like outer peripheral surface of a cylindrical suction drum 20, as shown in FIG. 1. Here, high-pressure steam is sprayed onto the third sheet layer 33 from a steam nozzle 21 situated above the outer peripheral surface of the suction drum 20. The suction drum 20 has a built-in suction device, with steam sprayed from the steam nozzle 21 being drawn by the suction device. The heat of the high-pressure steam sprayed from the steam nozzle 21 causes expansion of the heat-expanding particles in the third sheet layer 33, increasing the bulk of the third sheet layer 33.

The surface of the third sheet layer 33 on which the high-pressure steam is sprayed is preferably the surface on which the second sheet layer 32 is disposed. Since the high-pressure steam directly contacts with the heat-expanding particles 60 of the third sheet layer 33 it is possible to provide instant high heat to the heat-expanding particles 60. This allows the heat-expanding particles 60 to be rapidly expanded before the third sheet layer 33 dries and the hydrogen bonding force between the fibers of the third sheet layer 33 increases. In addition, since there is minimal loosening of the fibers in the first sheet layer 31 section of the third sheet layer 33 by the high-pressure steam, the strength of the first sheet layer 31 section can be maintained even when high-pressure steam is sprayed onto the third sheet layer 33.

The high-pressure steam sprayed from the steam nozzle 21 may be steam composed of 100% water, or it may be steam containing other gases such as air. However, the high-pressure steam sprayed from the steam nozzle 21 is preferably steam composed of 100% water.

The temperature of the high-pressure steam is preferably a temperature above the temperature at which the shells 61 of the heat-expanding particles 60 soften and the heat-expanding particles 60 expand. Also, since the heat-expanding particles 60 will contract at above a certain temperature, the temperature of the high-pressure steam is preferably a temperature of no higher than the temperature at which the heat-expanding particles 60 contract. Thus, the temperature of the high-pressure steam may be appropriately selected depending on the heat-expanding particles 60 that are used. For example, the high-pressure steam temperature may be 140° C. to 190° C. The temperature of the high-pressure steam sprayed from the steam nozzle 21 is in correlation with the vapor pressure of the high-pressure steam described below, and measuring the vapor pressure of the high-pressure steam allows measurement of the temperature of the high-pressure steam.

Figure 9:
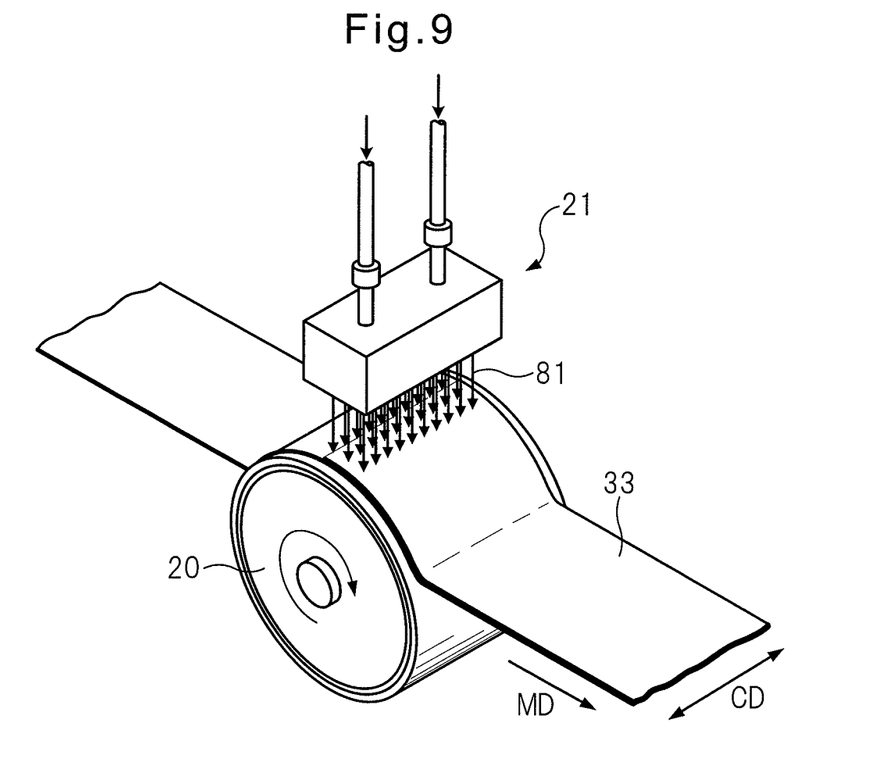
FIG. 9 is a diagram showing an example of a high-pressure steam nozzle.

FIG. 9 shows an example of the steam nozzle 21 situated above the suction drum 20. The steam nozzle 21 sprays a plurality of high-pressure steam jets 81 arranged in the machine direction (MD) and in the cross-machine direction (CD) of the third sheet layer 33, in the direction of the third sheet layer 33. As a result, the third sheet layer 33 expands and the bulk of the third sheet layer 33 increases.

Figure 10:
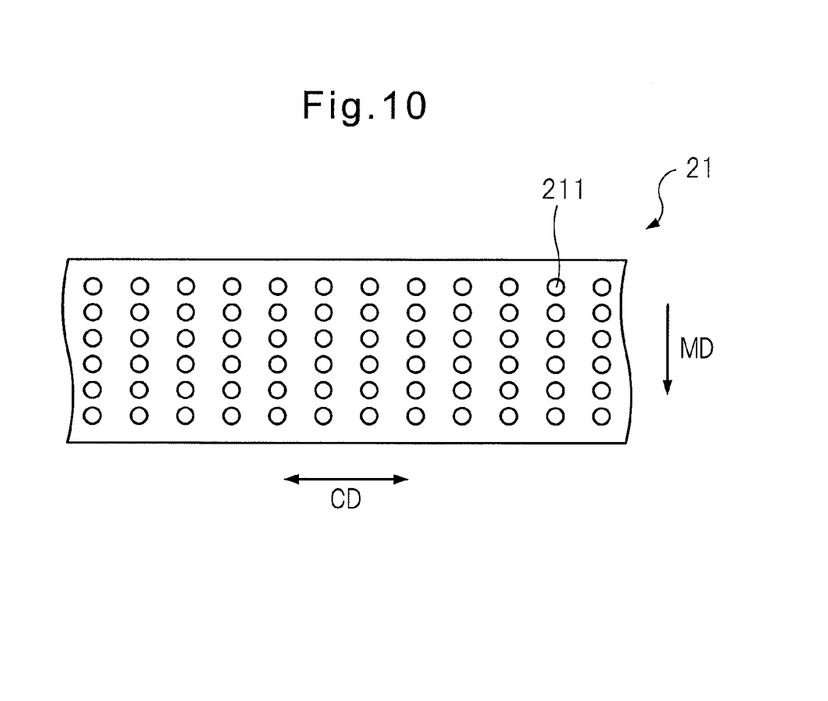
FIG. 10 is a diagram showing an example of a nozzle hole in a high-pressure steam nozzle.

FIG. 10 is a diagram showing an example of nozzle holes 211 in a steam nozzle 21. As seen by the steam nozzle 21 shown in FIG. 10, the nozzle hole rows of the nozzle holes 211 aligned in the cross-machine direction (CD) are arranged in 6 rows in the machine direction (MD). For easy visualization of the high-pressure steams 81 in FIG. 9, only 3 rows in the machine direction (MD) are shown among the plurality of high-pressure steam jets 81 aligned in the cross-machine direction (CD) of the third sheet layer 33; however, there are in fact 6 rows.

Also, the number of rows arranged in the machine direction (MD), of the plurality of nozzle holes aligned in the cross-machine direction (CD), is preferably 4 or greater and is not limited to 6. By situating 4 or more rows in the machine direction (MD), of the plurality of nozzle holes aligned in the cross-machine direction (CD), it is possible to supply sufficient heat for expansion of the heat-expanding particles to the third sheet layer 33 by the high-pressure steam, even with a fast travelling speed for the third sheet layer 33 in the machine direction (MD). This can increase production efficiency for the nonwoven fabric. The plurality of high-pressure steam nozzles may be aligned in the machine direction (MD), so that the plurality of nozzle holes aligned in the cross-machine direction (CD) are situated along 4 or more rows in the machine direction (MD).

The hole diameters of the nozzle holes of the steam nozzle 21 are preferably 100 to 250 μm. If the hole diameters of the nozzle holes are smaller than 100 μm, the energy will be deficient and it may not be possible to adequately heat the heat-expanding particles. Furthermore, if the hole diameters of the steam nozzle 21 are greater than 250 μm, the energy supplied to the third sheet layer 33 will be too great and excessive damage may occur in the third sheet layer 33.

The hole pitch of the nozzle holes (the distance between the centers of adjacent nozzle holes in the cross-machine direction (CD)) is preferably 0.5 to 1.0 mm. If the hole pitch of the nozzle holes is less than 0.5 mm, the pressure resistance of the steam nozzle 21 may be reduced and damage may occur. If the hole pitch of the nozzle holes is greater than 1.0 mm, regions with inadequate heating may be created in the third sheet layer 33. This can increase variation in the bulk of the third sheet layer 33.

The vapor pressure of the high-pressure steam sprayed from the steam nozzles 14 is preferably 0.4 to 1.5 MPa. If the vapor pressure of the high-pressure steam is lower than 0.4 MPa, the high-pressure steam will not sufficiently contact with the heat-expanding particles 60 in the third sheet layer 33, potentially resulting in inadequate heating of the heat-expanding particles 60. Also, if the vapor pressure of the high-pressure steam is higher than 1.5 MPa, holes may open in the third sheet layer 33, the third sheet layer 33 may undergo tearing, and fly-off may occur.

Figure 11:
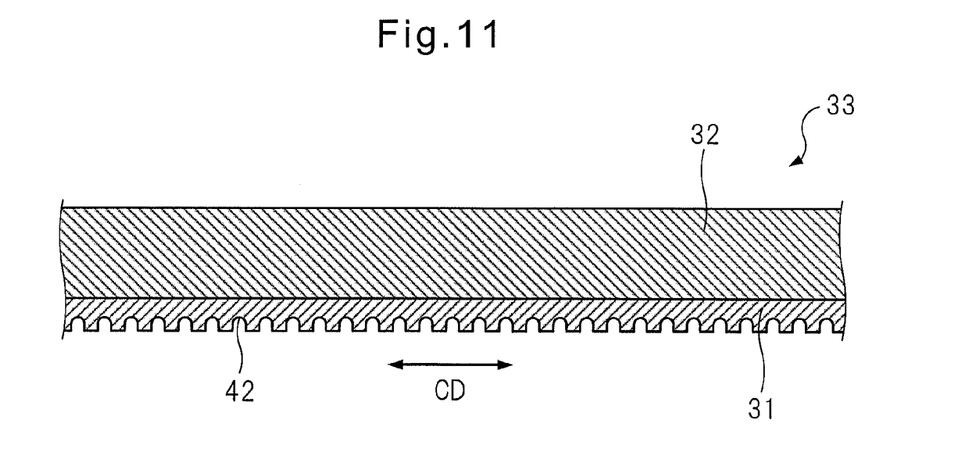
FIG. 11 is a widthwise cross-sectional schematic diagram of a third sheet layer that has been sprayed with high-pressure steam.

FIG. 11 is a cross-sectional schematic diagram, in the cross-machine direction (CD), of a third sheet layer 33 that has been sprayed with high-pressure steam. The third sheet layer 33 has a longitudinal direction, a transverse direction crossing the longitudinal direction, a thickness direction perpendicular to the longitudinal direction and the transverse direction, a first surface perpendicular to the thickness direction and a second surface opposite the first surface in the thickness direction, and it is provided with a fiber-containing first layer 31 having a plurality of grooves 42 extending in the longitudinal direction and aligned in the transverse direction, on the first surface, and a second sheet layer 32 comprising expanded heat-expanding particles and fibers, on the second surface. Here, the longitudinal direction corresponds to the machine direction (MD) (see FIG. 9), and the transverse direction corresponds to the cross-machine direction (CD).

Because the heat-expanding particles have been expanded by high-pressure steam, the second sheet layer 32 section of the third sheet layer 33 after spraying of the high-pressure steam is thicker compared to the second sheet layer 32 section of the third sheet layer 33 before spraying of the high-pressure steam, shown in FIG. 8. Thus, the bulk of the third sheet layer 33 after spraying of the high-pressure steam can be increased by 30% or more compared to the third sheet layer 33 before spraying of the high-pressure steam, shown in FIG. 8.

Also, the first sheet layer 31 section of the third sheet layer 33 is the section that is sprayed with a high-pressure water jet and has increased strength. On the other hand, the second sheet layer 32 section has weaker loose strength of the fibers due to expansion of the heat-expanding particles; however, it is the section with increased thickness. By thus forming a high-strength section 31 and weak yet bulky section 32 in the third sheet layer 33, it is possible to obtain a balance between strength and bulk for the third sheet layer 33. In other words, this allows formation of a sheet layer 33 with both bulk and high strength. Therefore, the thickness of the second sheet layer 32 section is preferably at least twice the thickness of the first sheet layer 31 section.

One or more other layers may also be provided between the first sheet layer 31 and the second sheet layer 32. In such cases as well, the first sheet layer 31 section and the second sheet layer 32 section will be able to constitute a bulky and high-strength sheet layer.

If the bulk of the nonwoven fabric is increased, this will increase the capacity of the nonwoven fabric to capture dirt when the nonwoven fabric is used to wipe an object. As a result, the wiping power of the nonwoven fabric is improved by the significantly increased bulk of the third sheet layer 33. Furthermore, since there is more space for storage of water in the nonwoven fabric, the water retention of the nonwoven fabric increases.

The third sheet layer 33 is drawn to the suction drum 20 by a suction device built into the suction drum 20. The suction force with which the suction drum 20 draws the third sheet layer 33 is preferably −5 to −12 kPa. If the suction force of the suction drum 20 is lower than −5 kPa, it may not be able to draw in steam or create updraft. Also, if the suction force of the suction drum 20 is higher than −12 kPa, shedding of fibers into the suction zone may increase.

The distance between the tip of the steam nozzle 21 and the surface of the third sheet layer 33 is preferably 1.0 to 10 mm. If the distance between the tip of the steam nozzle 21 and the surface of the third sheet layer 33 is smaller than 1.0 mm, holes may open in the third sheet layer 33, the third sheet layer 33 may undergo tearing, and fly-off may occur. Also, if the distance between the tip of the steam nozzle 21 and the surface of the third sheet layer 33 is greater than 10 mm, the high-pressure steam may disperse and the efficiency of supplying heat to the heat-expanding particles in the third sheet layer 33 may be poor.

The moisture content of the third sheet layer 33 after the high-pressure steam has been sprayed is preferably not greater than 40% and more preferably not greater than 30%. If the moisture content of the third sheet layer 33 after the high-pressure steam has been sprayed is greater than 40%, it may become difficult to obtain a moisture content of not greater than 5% for the third sheet layer 33 by drying with the dryer, described below. Also, additional drying may become necessary in addition to the dryer described below, and production efficiency of the nonwoven fabric may be reduced.

Transfer is then carried out to the dryer 22, as shown in FIG. 1. The dryer 22 dries the third sheet layer 33 on which the high-pressure steam has been sprayed, until the final nonwoven fabric product is obtained. A Yankee dryer, for example, may be used as the dryer 22. The dryer 22 adheres the third sheet layer 33 onto the surface of the cylindrical dryer that has been heated to about 150° C. by steam, to dry the third sheet layer 33.

The third sheet layer 33 that has passed through the dryer 22 must be in a thoroughly dry state. Specifically, the moisture content of the third sheet layer 33 that has passed through the dryer 22 is preferably not greater than 5%. Incidentally, if the moisture content of the third sheet layer 33 is not greater than 5% immediately after having been sprayed with the high-pressure steam, the third sheet layer 33 that has been sprayed with the high-pressure steam does not need to be further dried using the dryer 22.

The dried third sheet layer 33 (nonwoven fabric) is wound up onto a winder 23.

The nonwoven fabric prepared in this manner may be cut to prescribed dimensions and the nonwoven fabric may be used as a dry wipe. Also, the nonwoven fabric prepared in this manner may be cut to prescribed dimensions and the cut nonwoven fabric impregnated with a chemical solution, for use of the nonwoven fabric as a wet wipe. Since the capacity of the nonwoven fabric to capture dirt is improved due to the increased bulk of the sheet layer as explained above, the wipe formed from the nonwoven fabric can easily remove dirt. Because of the high strength of the first sheet layer 31 section of the nonwoven fabric, wiping an object with the first sheet layer 31 section of the nonwoven fabric can prevent shedding of fibers on the surface of the nonwoven fabric when the object is wiped. Also, since the nonwoven fabric prepared as described above has high bulk, the feel of the nonwoven fabric on the skin is satisfactory, so that the nonwoven fabric is suitable as a wipe for wiping human or animal bodies. Furthermore, the high bulk of the nonwoven fabric prepared as described above allows it to retain more moisture, making it suitable as a wet wipe.

In addition, by using the first sheet layer section of the nonwoven fabric prepared as described above as a top sheet and using the second sheet layer section as an absorbent body, it is possible to use the nonwoven fabric as an absorbent article, such as a panty liner. By using the nonwoven fabric as an absorbent article it is possible to produce a very thin absorbent article.

The explanation above is merely an example, and the invention is in no way restricted by the described embodiment.

EXAMPLES

The invention will now be explained in greater detail by examples. However, it is to be understood that the invention is not limited by these examples.

In the examples and comparative examples, the moisture content of the sheet layer before steam spraying, and the first sheet layer basis weight, second sheet layer basis weight, third sheet layer basis weight, dry thickness, density, first sheet layer apparent thickness, second sheet layer apparent thickness, post-pressing thickness, wet thickness, dry tensile strength, wet tensile strength, moisture absorption and fastness to rubbing were measured in the following manner.

(Moisture Content of Sheet Layer Before Steam Spraying)

A sample piece with a size of 30 cm×30 cm was taken from the sheet layer that had been dried with the dryer 19, and the weight (W1) of the sample piece was measured. The sample piece was then allowed to stand for 1 hour in a thermostatic bath at 105° C. for drying, and the weight (D1) was subsequently measured. The moisture content of the sheet layer before steam spraying is the average value of N=10 measured values.

Moisture content of sheet layer before steam spraying= $(W1-D1)/W1 \times 100 (\%)$ (Basis Weights of First Sheet Layer, Second Sheet Layer and Third Sheet Layer)

The basis weight of the first sheet layer, the basis weight of the second sheet layer and the basis weight of the third sheet layer were measured in the following manner. First, the first sheet layer alone, without formation of the second sheet layer, was passed through the nonwoven fabric production line. A measuring sample with a size of 30 cm×30 cm was taken from the first sheet layer that had been dried with the dryer 19 before spraying with the high-pressure steam, and the weight of the taken measuring sample was measured to calculate the basis weight of the first sheet layer. The basis weights of the first sheet layers of the examples and comparative examples are the average values for 10 measuring samples. Next, the first sheet layer and second sheet layer were formed, and the third sheet layer was passed through the nonwoven fabric production line. Also, a measuring sample with a size of 30 cm×30 cm was taken from the third sheet layer that had been dried with the dryer 19 before spraying with the high-pressure steam, and the weight of the taken measuring sample was measured to calculate the basis weight of the third sheet layer. The basis weights of the third sheet layers of the examples and comparative examples are the average values for 10 measuring samples. The basis weight of the second sheet layer was calculated by subtracting the basis weight of the first sheet layer from the basis weight of the third sheet layer.

(Dry Thickness)

A measuring sample with a size of 10 cm×10 cm was taken from the produced nonwoven fabric. A thickness gauge (Model FS-60DS by Daiei Kagaku Seiki Mfg. Co., Ltd.) equipped with a 15 cm$^2$ stylus was used to measure the thickness of the measuring sample under measuring conditions with a measuring load of 3 gf/cm$^2$. The thickness was measured at three locations for each measuring sample, and the average value of the three thicknesses was recorded as the dry thickness.

(Density)

A measuring sample with a size of 10 cm×10 cm was taken from the produced nonwoven fabric. The weight of the measuring sample was measured, and the density of the nonwoven fabric was calculated from the dry thickness.

(First Sheet Layer and Second Sheet Layer Apparent Thicknesses)

A measuring sample with a size of 10 cm×10 cm was taken from the first sheet layer that had been dried with the dryer 19 before spraying with the high-pressure steam, which had been used for measurement of the basis weight of the first sheet layer. A thickness gauge (Model FS-60DS by Daiei Kagaku Seiki Mfg. Co., Ltd.) equipped with a 15 cm$^2$ stylus was used to measure the thickness of the measuring sample under measuring conditions with a measuring load of 3 gf/cm$^2$. The thickness was measured at three locations for each measuring sample, and the average value of the three thicknesses was recorded as the first sheet layer apparent thickness. Also, a measuring sample with a size of 10 cm×10 cm was taken from the third sheet layer that had been dried with the dryer 19 before spraying with the high-pressure steam, which had been used for measurement of the basis weight of the third sheet layer. A thickness gauge (Model FS-60DS by Daiei Kagaku Seiki Mfg. Co., Ltd.) equipped with a 15 cm$^2$ stylus was used to measure the thickness of the measuring sample under measuring conditions with a measuring load of 3 gf/cm$^2$. The thickness was measured at three locations for each measuring sample, and the average value of the three thicknesses was recorded as the third sheet layer apparent thickness. Also, the second sheet layer apparent thickness was calculated by subtracting the first sheet layer apparent thickness from the third sheet layer apparent thickness.

(Post-Pressing Dry Thickness)

A measuring sample with a size of 10 cm×10 cm was taken from the produced nonwoven fabric. A weight with a weight of 1 kg, having a 10 cm×10 cm base, was set on the prepared measuring sample for 3 minutes, for pressing of the measuring sample for 3 minutes. After removing the weight from the measuring sample, it was allowed to stand for 3 minutes. Also, a thickness gauge (Model FS-60DS by Daiei Kagaku Seiki Mfg. Co., Ltd.) equipped with a 15 cm$^2$ stylus was used to measure the thickness of the measuring sample after pressing, under measuring conditions with a measuring load of 3 gf/cm$^2$. The thickness was measured at three locations for each measuring sample, and the average value of the three thicknesses was recorded as the post-pressing dry thickness.

(Wet Thickness)

A measuring sample with a size of 10 cm×10 cm was taken from the produced nonwoven fabric. The measuring sample was impregnated with water in an amount of 4 times the mass of the measuring sample (hydrated swell factor: 400%). After allowing the water-impregnated measuring sample to stand for 10 minutes, a thickness gauge (Model FS-60DS by Daiei Kagaku Seiki Mfg. Co., Ltd.) equipped with a 15 cm$^2$ stylus was used to measure the thickness of the measuring sample under measuring conditions with a measuring load of 3 gf/cm$^2$. The thickness was measured at three locations for each measuring sample, and the average value of the three thicknesses was recorded as the wet thickness.

(Dry Tensile Strength)

A 25 mm-wide test strip having the lengthwise direction in the machine direction of the sheet layer and a 25 mm-wide test strip having the lengthwise direction in the cross-machine direction of the sheet layer were cut out from the produced nonwoven fabric, to prepare measuring samples. The measuring samples in the machine direction and cross-machine direction were measured using a tensile tester equipped with a load cell with a maximum load capacity of 50N (AGS-1kNG Autograph, product of Shimadzu Corp.), and the tensile strengths of three measuring samples each were measured with each measuring sample under conditions with a clamp distance of 100 mm and a pull rate of 100 mm/min. The average values of the tensile strengths of the three measuring samples for each of the measuring samples in the machine direction and cross-machine direction were recorded as the dry tensile strength in the machine direction and the cross-machine direction, respectively.

(Wet Tensile Strength)

A 25 mm-wide test strip having the lengthwise direction in the machine direction of the sheet layer and a 25 mm-wide test strip having the lengthwise direction in the cross-machine direction of the sheet layer were cut out from the produced nonwoven fabric, to prepare measuring samples, and the measuring samples were impregnated with water in an amount of 2.5 times the mass of the measuring sample (hydrated swell factor: 250%). Also, the measuring samples in the machine direction and cross-machine direction were measured using a tensile tester equipped with a load cell with a maximum load capacity of 50N (AGS-1kNG Autograph, product of Shimadzu Corp.), and the tensile strengths of three measuring samples each were measured with each measuring sample under conditions with a clamp distance of 100 mm and a pull rate of 100 mm/min. The average values of the tensile strengths of the three measuring samples for each of the measuring samples in the machine direction and cross-machine direction were recorded as the wet tensile strength in the machine direction and the cross-machine direction, respectively.

(Moisture Absorption)

A measuring sample with a size of 10 cm×10 cm was taken from the produced nonwoven fabric. After measuring the mass of the measuring sample, the measuring sample was dipped in distilled water for 1 minute. After then standing for 1 minute on a net (80 mesh), the mass of the measuring sample was measured. The value of the mass of the measuring sample before dipping in distilled water subtracted from the mass of the measuring sample after dipping in distilled water was recorded in terms of the value per 1 m$^2$ of nonwoven fabric. The calculated value was used as the moisture absorption.

(Fastness to Rubbing)

A fastness to rubbing test was conducted based on the Method for Friction Coefficient Test of Plastic Film and Sheet (JIS-K-7125:1999). A measuring sample with a size of 300 mm×200 mm was taken from the produced nonwoven fabric, and the measuring sample was mounted on the table of a frictional coefficient measuring device (product of Tester Sangyo Co., Ltd.), with the measuring surface (the first sheet layer surface or second sheet layer surface) facing upward. During this time, the measuring sample was situated so that the movement direction of the sliding strip was in the direction of the 200 mm length of the measuring sample. Fabric adhesive tape (No. 123, product of Nichiban Co., Ltd.) was attached to the surface of the sliding plate in contact with the measuring sample. Also, frictional coefficient measurement was conducted under conditions with an abrasion stroke speed of 30/min and a 200 g load, until tearing occurred in the surface of the measuring sample. The number of frictional coefficient measurements performed before tearing occurred in the surface of the measuring sample was recorded as the fastness to rubbing.

The production methods used in the examples and comparative examples will now be explained.

Example 1

Example 1 was prepared using a nonwoven fabric production apparatus 1 according to the embodiment of the invention. A first sheet-forming material was prepared containing 50 wt % of Northern bleached Kraft pulp (NBKP) and 50 wt % of rayon (Corona, product of Daiwabo Rayon Co., Ltd.), having a size of 1.1 dtex and a fiber length of 8 mm. Also, a starting material head was used to supply a first sheet-forming material onto a sheet layer-forming belt (OS80, by Nippon Filcon Co., Ltd.), and a suction box was used for dehydration of the first sheet-forming material to form a first sheet layer. The sheet layer moisture content of the first sheet layer was 80%. Next, two high-pressure water jet nozzles were used to spray high-pressure water jets onto the first sheet layer. The high-pressure water jet energy of the high-pressure water jet sprayed onto the first sheet layer using the two high-pressure water jet nozzles was 0.2846 kW/m². The high-pressure water jet energy is calculated by the following formula.

Energy (kW/m²)=1.63×spray pressure (kg/cm²)×spray flow rate (m³/min)/treatment rate (M/min)/60

Here, the spray flow rate (cubic M/min)=750×orifice total open area (m²)×spray pressure (kg/cm²)$^{0.495}$ The distance between the tips of the high-pressure water jet nozzles and the top surface of the first sheet layer was 10 mm. Also, the hole diameter of each nozzle hole of the high-pressure water jet nozzle was 92 µm and the hole pitch of the nozzle holes was 0.5 mm.

Next, the first sheet layer that had been sprayed with the high-pressure water jet was transferred to the sheet layer-transporting conveyor.

A second sheet-forming material was prepared comprising 37 wt % of Northern bleached Kraft pulp (NBKP), 37 wt % of broadleaf tree bleached Kraft pulp (LBKP), 20 wt % of heat-expanding particles (Matsumoto microspheres, product of Matsumoto Yushi-Seiyaku Co., Ltd., particle diameter: 5 to 15 µm, thermal expansion start temperature: 75° C. to 85° C.), 3.0 wt % of a heat-expanding particle anchoring agent (FILEX RC-104, product of Meisei Chemical Works, Ltd., cation-modified acrylic copolymer) and 3.0 wt % of a heat-expanding particle anchoring agent (FILEX M, product of Meisei Chemical Works, Ltd., acrylic copolymer). Also, the second sheet-forming material was supplied to a sheet-forming vat, and the fibers to which the heat-expanding particles had become anchored in the second sheet-forming material were drawn into a rotating cylinder mold to form a second sheet layer on the cylinder mold. Next, the second sheet layer formed on the cylinder mold was layered onto the first sheet layer that had been transferred to the sheet layer-transporting conveyor, to form a third sheet layer.

After transferring the third sheet layer to another single sheet layer-transporting conveyor, it was transferred to a Yankee dryer that had been heated to 110° C., to dry the third sheet layer to a third sheet layer moisture content of 60%.

Next, a single steam nozzle was used to spray high-pressure steam onto a surface of the third sheet layer, which is formed by the second sheet layer. The vapor pressure of the high-pressure steam at this time was 0.7 MPa, and the steam temperature was 175° C. Also, the distance between the tip of the steam nozzle and the surface of the sheet layer was 2.0 mm. The nozzle holes of the steam nozzle were arranged in 6 rows in the machine direction (MD). The hole diameters of the nozzle holes of the steam nozzle were 200 µm, and the hole pitch was 1.0 mm. Also, the suction force with which the suction drum drew the sheet layer was −5.0 kPa. An 18 mesh stainless steel open-hole sleeve was used around the outer periphery of the suction drum.

The third sheet layer was transferred to a Yankee dryer that had been heated to 150° C., and the dried to a moisture content of not greater than 5%. The dried sheet layer was used as Example 1.

Example 2

Example 2 was produced by the same method as the method for producing Example 1, except that the steam temperature of the high-pressure steam was 140° C. and the vapor pressure was 0.4 MPa.

Example 3

Example 3 was produced by the same method as the method for producing Example 1, except that the fiber density of the first sheet-forming material was adjusted so that the basis weight of the first sheet layer was 15 g/m².

Example 4

Example 4 was produced by the same method as the method for producing Example 1, except that the third sheet layer was dried so that the moisture content of the third sheet layer was 20% before spraying of the high-pressure steam.

Comparative Example 1

Comparative Example 1 was produced by the same method as the method for producing Example 1, except that the nonwoven fabric was prepared with only the first sheet layer without forming a second sheet layer, and no high-pressure steam was sprayed.

Comparative Example 2

Comparative Example 2 was produced by the same method as the method for producing Example 1, except that the nonwoven fabric was prepared with only the second sheet layer without forming a first sheet layer.

Comparative Example 3

Comparative Example 3 was produced by the same method as the method for producing Example 1, except that the nonwoven fabric was prepared with only the second sheet layer without forming a first sheet layer, the steam temperature of the high-pressure steam was 115° C. and the vapor pressure was 0.2 MPa, the nozzle holes of the steam nozzle were arranged in 3 rows in the machine direction (MD), the hole diameters of the nozzle holes of the steam nozzle were 300 μm, and the hole pitch was 2.0 mm.

The starting materials for the examples and comparative examples are shown in Table 1.

TABLE 1

Starting materials for Examples and Comparative Examples

| | Sheet-forming starting material for first sheet layer | | Sheet-forming starting material for second sheet layer | | | | |
|---|---|---|---|---|---|---|---|
| | NBKP (CSF700 cc) | Rayon 1.1 dtex × 8 mm | NBKP (CSF700 cc) | LBKP | Matsumoto microspheres F-36 | FILEX RC104 | FILEX M |
| Example 1 | 50% | 50% | 37% | 37% | 20% | 3% | 3% |
| Example 2 | 50% | 50% | 37% | 37% | 20% | 3% | 3% |
| Example 3 | 50% | 50% | 37% | 37% | 20% | 3% | 3% |
| Example 4 | 50% | 50% | 37% | 37% | 20% | 3% | 3% |
| Comp. Ex. 1 | 50% | 50% | — | — | — | — | — |
| Comp. Ex. 2 | — | — | 37% | 37% | 20% | 3% | 3% |
| Comp. Ex. 3 | — | — | 37% | 37% | 20% | 3% | 3% |

The production conditions for the examples and comparative examples are shown in Table 2.

TABLE 2

Production conditions for Examples and Comparative Examples

| | High-pressure water jet energy (kW/m²) | Steam pressure (MPa) | Steam nozzle temperature (° C.) | Steam nozzle hole diameter (μm) | Steam nozzle hole pitch (mm) | Number of rows of nozzle holes in steam nozzle | Distance between steam nozzle and sheet layer (mm) | Suction drum pressure (kPa) | Mesh of suction drum outer periphery |
|---|---|---|---|---|---|---|---|---|---|
| Example 1 | 0.2846 | 0.7 | 175 | 200 | 1 | 6 | 2 | −5.0 | 18 |
| Example 2 | 0.2846 | 0.4 | 140 | 200 | 1 | 6 | 2 | −5.0 | 18 |
| Example 3 | 0.2846 | 0.7 | 175 | 200 | 1 | 6 | 2 | −5.0 | 18 |
| Example 4 | 0.2846 | 0.7 | 175 | 200 | 1 | 6 | 2 | −5.0 | 18 |
| Comp. Ex. 1 | 0.2846 | — | — | — | — | — | — | — | — |
| Comp. Ex. 2 | — | 0.7 | 175 | 200 | 1 | 6 | 2 | −5.0 | 18 |
| Comp. Ex. 3 | — | 0.2 | 115 | 300 | 2 | 3 | 2 | −5.0 | 18 |

Table 3 shows the moisture content of the sheet layer before steam spraying, and the first sheet layer basis weight, second sheet layer basis weight, third sheet layer basis weight, dry thickness, density, first sheet layer apparent thickness, second sheet layer apparent thickness, post-pressing thickness, ratio of post-pressing thickness to dry thickness, wet thickness, and ratio of wet thickness to dry thickness, for the examples and comparative examples described above.

TABLE 3

Moisture content of sheet layer before steam spraying, basis weight of first sheet layer, basis weight of second sheet layer, basis weight of third sheet layer, dry thickness, density, apparent thickness of first sheet layer, apparent thickness of second sheet layer, post-pressing thickness, post-pressing thickness/dry thickness × 100, wet thickness and wet thickness/dry thickness × 100, for Examples and Comparative Examples

| | Moisture content of sheet layer before steam spraying | Basis weight of 1st sheet layer (g/m²) | Basis weight of 2nd sheet layer (g/m²) | Basis weight of 3rd sheet layer (g/m²) | Dry thickness (mm) | Density (g/m³) | Apparent thickness of 1st sheet layer (mm) | Apparent thickness of 2nd sheet layer (mm) | Post-pressing thickness (mm) | Post-pressing thickness/dry thickness × 100 | Wet thickness (mm) | Wet thickness/dry thickness × 100 |
|---|---|---|---|---|---|---|---|---|---|---|---|---|
| Example 1 | 60% | 20.0 | 20.0 | 40.0 | 1.22 | 0.03 | 0.22 | 1.00 | 1.15 | 94.3% | 1.12 | 91.8% |
| Example 2 | 60% | 20.0 | 20.0 | 40.0 | 0.87 | 0.05 | 0.22 | 0.65 | 0.85 | 97.7% | 0.79 | 90.8% |
| Example 3 | 60% | 15.0 | 20.0 | 35.0 | 1.17 | 0.03 | 0.19 | 0.98 | 1.12 | 95.7% | 1.08 | 92.3% |
| Example 4 | 20% | 20.0 | 20.0 | 40.0 | 0.82 | 0.05 | 0.22 | 0.59 | 0.78 | 95.1% | 0.74 | 90.2% |
| Comp. Ex. 1 | — | 20.0 | — | — | 0.23 | 0.09 | — | — | 0.20 | 87.0% | 0.24 | 104.3% |

TABLE 3-continued

Moisture content of sheet layer before steam spraying, basis weight of first sheet layer, basis weight of second sheet layer, basis weight of third sheet layer, dry thickness, density, apparent thickness of first sheet layer, apparent thickness of second sheet layer, post-pressing thickness, post-pressing thickness/dry thickness × 100, wet thickness and wet thickness/dry thickness × 100, for Examples and Comparative Examples

| | Moisture content of sheet layer before steam spraying | Basis weight of 1st sheet layer (g/m²) | Basis weight of 2nd sheet layer (g/m²) | Basis weight of 3rd sheet layer (g/m²) | Dry thickness (mm) | Density (g/m³) | Apparent thickness of 1st sheet layer (mm) | Apparent thickness of 2nd sheet layer (mm) | Post-pressing thickness (mm) | Post-pressing thickness/dry thickness × 100 | Wet thickness (mm) | Wet thickness/dry thickness × 100 |
|---|---|---|---|---|---|---|---|---|---|---|---|---|
| Comp. Ex. 2 | 60% | — | 20.0 | — | 1.02 | 0.02 | — | — | 0.95 | 93.1% | 0.92 | 90.2% |
| Comp. Ex. 3 | 60% | — | 20.0 | — | 0.61 | 0.03 | — | — | 0.53 | 86.9% | 0.48 | 78.7% |

Table 4 shows the dry tensile strength, wet tensile strength, moisture absorption and fastness to rubbing, for the examples and comparative examples described above.

TABLE 4

Dry tensile strength, wet tensile strength, moisture absorption, fastness to rubbing on first sheet layer side and fastness to rubbing on second sheet layer side, for Examples and Comparative Examples

| | Dry tensile strength (N/25 mm) | | Wet tensile strength (N/25 mm) | | Moisture absorption | Fastness to rubbing (times) | |
|---|---|---|---|---|---|---|---|
| | MD | CD | MD | CD | (g/m²) | First sheet layer side | Second sheet layer side |
| Example 1 | 8.4 | 5.6 | 1.7 | 1.5 | 582 | 167 | 18 |
| Example 2 | 9.6 | 6.3 | 1.9 | 1.7 | 467 | 181 | 14 |
| Example 3 | 7.6 | 5.2 | 1.5 | 1.3 | 541 | 124 | 21 |
| Example 4 | 10.4 | 7.0 | 2.4 | 2.1 | 388 | 177 | 27 |
| Comp. Ex. 1 | 9.5 | 7.8 | 1.7 | 1.6 | 74 | 157 | — |
| Comp. Ex. 2 | 2.1 | 0.7 | 0.8 | 0.3 | 553 | — | 14 |
| Comp. Ex. 3 | 1.2 | 0.3 | 0.5 | 0.2 | 316 | — | 31 |

(1) Comparison of Examples 1 to 4 with Comparative Example 1

The dry thicknesses of Examples 1 to 4 were all 0.82 mm or greater. The dry thickness of Comparative Example 1, on the other hand, was 0.23 mm. The basis weight of Comparative Example 1 was 20 g/m², which was about half that in Examples 1 to 4, and therefore the thickness of Comparative Example 1 was 0.46 mm even when the thickness of Comparative Example 1 was doubled to match the basis weights of Examples 1 to 4. This indicated that the nonwoven fabric bulk can be dramatically increased by providing a second sheet layer comprising heat-expanding particles. Also, the moisture absorption of Comparative Example 1 was very low compared to the moisture absorption in Examples 1 to 4. This indicated that the nonwoven fabric moisture absorption can be dramatically increased by providing a second sheet layer comprising heat-expanding particles.

(2) Comparison of Examples 1 to 4 with Comparative Examples 2 and 3

The dry tensile strength and wet tensile strength were very low in Comparative Examples 2 and 3 compared to the dry tensile strength and wet tensile strength in Examples 1 to 4. This indicated that the strength of a nonwoven fabric comprising heat-expanding particles is dramatically increased by providing a first sheet layer. In addition, the fastness to rubbing in Comparative Examples 2 and 3 was very low compared to the fastness to rubbing on a surface of the third sheet layer, which is formed by the first sheet layer in Examples 1 to 4. This indicated that the fastness to rubbing of a nonwoven fabric comprising heat-expanding particles is dramatically increased by providing a first sheet layer.

(3) Comparison of Example 2 with Comparative Example 3

By comparing Example 2 with Comparative Example 3 it is seen that in order to maintain high bulk even when the nonwoven fabric is in a moist state, it is preferred for the vapor pressure of the high-pressure steam to be greater than 0.2 MPa, for the hole diameters of the nozzle holes of the steam nozzle to be smaller than 300 μm, for the hole pitch of the nozzle holes of the steam nozzle to be less than 2 mm and for the plurality of nozzle holes aligned in the cross-machine direction (CD) to be arranged in 4 or more rows in the machine direction (MD).

(4) Examples 1 to 4

From Examples 1 to 4 it is seen that the fastness to rubbing on the surface of the third sheet layer, which is formed by the first sheet layer was at least twice the fastness to rubbing on the surface of the third sheet layer, which is formed by the second sheet layer.

(5) Example 1, and Comparative Example 1 and Comparative Example 2

The moisture absorption in Comparative Example 1 can be considered to represent the moisture absorption of the first sheet layer section in Example 1, and the moisture absorption in Comparative Example 2 can be considered to represent the moisture absorption of the second sheet layer section in Example 1. This demonstrated that the moisture absorption of the second sheet layer section in Example 1 is twice the moisture absorption of the first sheet layer section in Example 1.

The invention claimed is:

1. A method of producing a nonwoven fabric, comprising the steps of:
   supplying a first sheet-forming material comprising fiber and water onto a belt moving in one direction, to form a first wet sheet layer on the belt,
   spraying a high-pressure water jet onto the first wet sheet layer to form grooves extending in the machine direction on the surface of the first wet sheet layer,
   forming a second sheet-forming material comprising fibers, heat-expanding particles and water into a sheet to form a second wet sheet layer,
   layering the first wet sheet layer and the second wet sheet layer to form a sheet laminate of the first and second wet sheet layers,
   drying the sheet laminate,
   spraying high-pressure steam having a vapor pressure of 0.4 to 1.5 MPa onto the sheet laminate from a steam nozzle to expand the heat-expanding particles, and
   drying the sheet laminate which particles have been expanded, to form a nonwoven fabric.

2. The method of producing a nonwoven fabric according to claim 1, wherein in the step of expanding the heat-expanding particles, the high-pressure steam is sprayed onto a surface of the sheet laminate, which is formed by the second wet sheet layer, from the steam nozzle.

3. The method of producing a nonwoven fabric according to claim 2, wherein in the step of drying the sheet laminate, a surface of the sheet laminate, which is formed by the first wet sheet layer, is heated to dry the sheet laminate.

4. The method of producing a nonwoven fabric according to claim 3, wherein the nozzle pitch of the nozzle holes of the steam nozzle is 0.5 to 1.0 mm.

5. The method of producing a nonwoven fabric according to claim 2, wherein in the step of drying the sheet laminate, the sheet laminate is dried so that the moisture content of the sheet laminate is 10% to 80%.

6. The method of producing a nonwoven fabric according to claim 2, wherein the nozzle pitch of the nozzle holes of the steam nozzle is 0.5 to 1.0 mm.

7. The method of producing a nonwoven fabric according to claim 1, wherein in the step of drying the sheet laminate, a surface of the sheet laminate, which is formed by the first wet sheet layer, is heated to dry the sheet laminate.

8. The method of producing a nonwoven fabric according to claim 7, wherein in the step of drying the sheet laminate, the sheet laminate is dried so that the moisture content of the sheet laminate is 10% to 80%.

9. The method of producing a nonwoven fabric according to claim 7, wherein the nozzle pitch of the nozzle holes of the steam nozzle is 0.5 to 1.0 mm.

10. The method of producing a nonwoven fabric according to claim 1, wherein in the step of drying the sheet laminate, the sheet laminate is dried so that the moisture content of the sheet laminate is 10% to 80%.

11. The method of producing a nonwoven fabric according to claim 10, wherein in the step of drying the sheet laminate, the sheet laminate is dried so that the moisture content of the sheet laminate is 10% to 80%.

12. The method of producing a nonwoven fabric according to claim 10, wherein the nozzle pitch of the nozzle holes of the steam nozzle is 0.5 to 1.0 mm.

13. The method of producing a nonwoven fabric according to claim 1, wherein the nozzle pitch of the nozzle holes of the steam nozzle is 0.5 to 1.0 mm.

14. The method of producing a nonwoven fabric according to claim 1, wherein the hole diameters of the nozzle holes of the steam nozzle are 100 to 250 μm.

15. The method for producing a nonwoven fabric according to claim 1, wherein the steam nozzle comprises 4 or more nozzle hole rows along the machine direction, of the nozzle holes aligned in the cross-machine direction.

* * * * *